United States Patent [19]

Shimansky et al.

[11] 4,245,566
[45] Jan. 20, 1981

[54] SAFETY SHIELD FOR VACUUM/PRESSURE CHAMBER VIEWING PORT

[75] Inventors: Richard A. Shimansky, Marlow Heights; Rodney S. Spencer, College Park, both of Md.

[73] Assignee: The United States of America as represented by the United States National Aeronautics and Space Administration, Washington, D.C.

[21] Appl. No.: 53,571

[22] Filed: Jun. 29, 1979

[51] Int. Cl.³ .............................................. E06B 9/00
[52] U.S. Cl. ...................................... 109/49.5; 49/171; 109/58.5; 220/82 R; 220/89 A
[58] Field of Search ................... 109/21.5, 49.5, 58.5; 49/171; 220/82 R, 89 A, 89 B; 350/310

[56] References Cited

U.S. PATENT DOCUMENTS

| | | | |
|---|---|---|---|
| 1,407,975 | 2/1922 | Wolfe et al. | 109/21.5 |
| 1,521,393 | 12/1924 | Ross | 109/21.5 |
| 1,686,942 | 10/1928 | Thielker | 109/21.5 |
| 2,736,231 | 2/1956 | Bauersfeld | 350/310 |
| 3,369,836 | 2/1968 | Haycock et al. | 109/49.5 X |
| 3,393,485 | 7/1968 | Wright | 109/58.5 X |
| 4,006,973 | 2/1977 | Zanotti et al. | 350/310 |

FOREIGN PATENT DOCUMENTS

| | | | |
|---|---|---|---|
| 839017 | 3/1939 | France | 350/310 |
| 1088131 | 3/1955 | France | 49/171 |

*Primary Examiner*—David H. Corbin
*Attorney, Agent, or Firm*—Robert D. Marchant; John R. Manning; John O. Tresansky

[57] ABSTRACT

A safety shield for protecting observers from flying debris resulting from a failure of a vacuum or pressure chamber viewing port following an implosion or explosion includes an optically clear shatter-resistant safety shield member spaced apart from the viewing port on the outer surface of the chamber.

6 Claims, 3 Drawing Figures

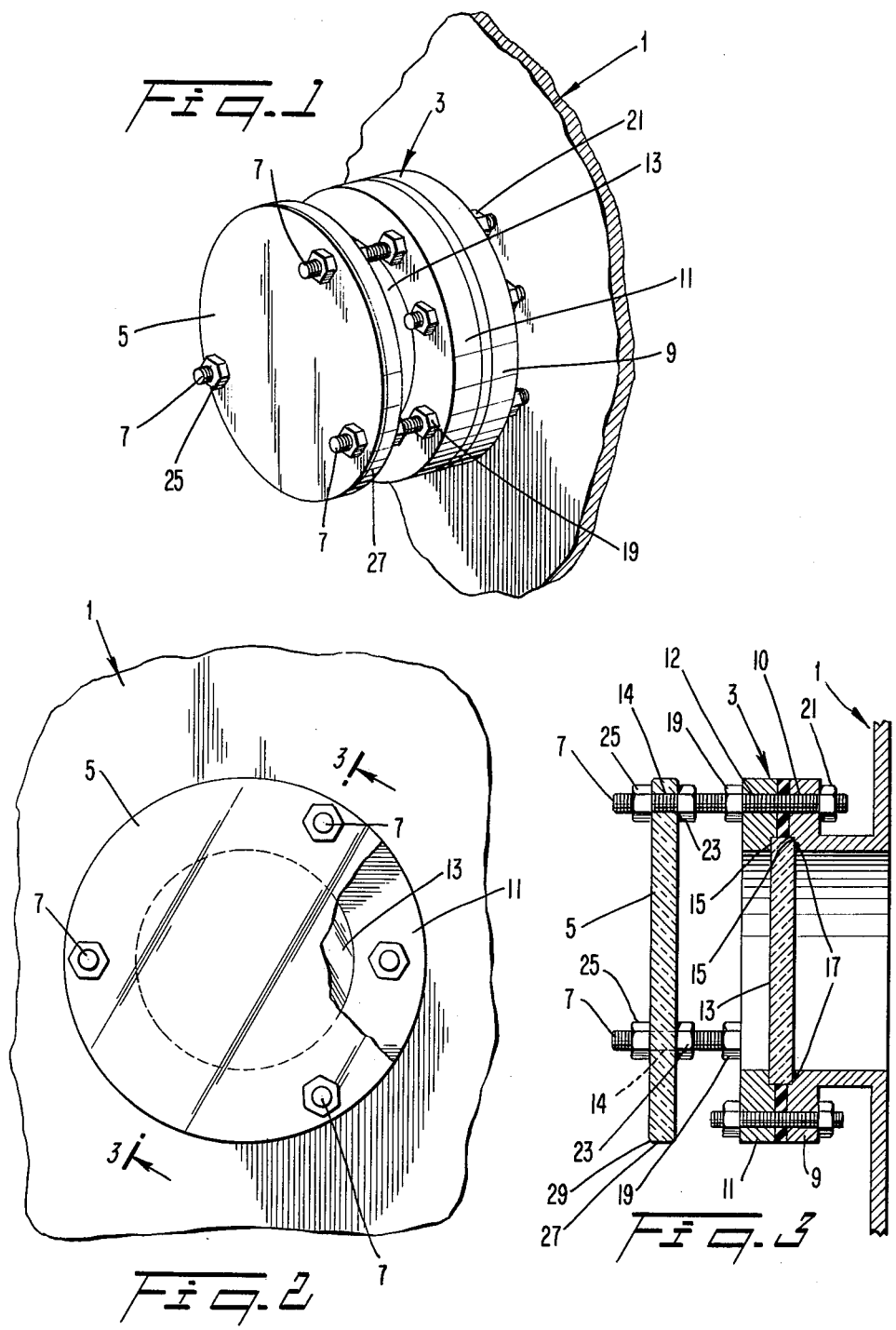

SAFETY SHIELD FOR VACUUM/PRESSURE CHAMBER VIEWING PORT

ORIGIN OF THE INVENTION

The invention described herein was made by employees of the U.S. Government, working at the National Aeronautics and Space Administration, and may be manufactured and used by or for the Government for governmental purposes without the payment of any royalties thereon or therefor.

BACKGROUND OF THE INVENTION

The invention relates to the field of safety shields and more particularly to an optically clear safety shield to be positioned over a vacuum or pressure equipment viewing port.

Vacuum and high pressure chambers are designed and constructed to handle large forces due to the pressure differential between the interior of the vacuum or pressure chamber and the exterior of the chamber (atmospheric pressure). It is common practice to include one or more viewing ports in the chamber to allow an observer to watch an experiment being performed within the chamber or to enable a photographic record of the experiment to be made. These viewing ports are normally formed integrally to and are airtight with the surface of the chamber, the window itself being formed from one or more thicknesses of an optically clear material, such as glass.

In a vacuum chamber, the interior of the chamber is held at a pressure considerably lower than atmospheric pressure. The forces acting on the walls and viewing ports of the chamber, therefore, will be directed inwardly toward the center of the chamber. In a high-pressure chamber, conversely, the interior of the chamber is held at a pressure higher than atmospheric pressure. Thus, the forces acting on the walls and viewing ports of the chamber will be outwardly directed.

In many vacuum and pressure chamber systems the chamber is cycled periodically to vary the vacuum or pressure applied to the interior of the chamber. After a number of vacuum or pressure cycles, the sealing arrangement of the viewing ports can become weakened or the window itself can become weakened due to the cyclic stresses. If the seal or window becomes sufficiently weakened the port will crack and shatter and, depending upon whether the air pressure is lower or higher than atmospheric within the chamber, implode or explode with considerable force. In either case, fragments of the shattered port will be propelled at high velocities presenting considerable danger to personnel in proximity to the chamber. In addition, any equipment disposed near the shattered viewing port will likely be damaged.

One prior art approach toward reducing the risk of a vacuum or pressure chamber viewing port or the like shattering under pressure is to fabricate a viewing port window of optically clear material which is supported by a metal grid to relieve stress on the window. In another prior art approach, an airtight viewing port is formed with two spaced-apart plates, one being flat and the other being curved. Other prior art approaches include providing a gas venting arrangement to prevent shattering of a dual window viewing port, and forming an impact resistant window assembly including a sheet of glass placed between a pair of spaced panes made of polycarbonate material.

While the described prior art vacuum and pressure chamber viewing ports do allow higher pressures to be sustained due to their "dual-window" or reinforced structure over those obtainable from single window viewing ports, the possibility still exists that such windows can shatter. In addition, these types of ports are costly to manufacture and can restrict the view through the port due to double refraction of light through the dual windows or interference by the reinforcing grid.

It is therefore an object of the invention to provide a safety shield for a vacuum or pressure chamber viewing port which affords a high degree of protection from flying fragments or debris resulting from accidental shattering of the port.

It is a further object to provide a safety shield for a vacuum or pressure chamber viewing port which does not restrict the view through the port.

It is another object to provide a safety shield which is easily manufactured and attached to a vacuum or pressure chamber viewing port.

SUMMARY OF THE INVENTION

These and other objects are achieved by the present invention wherein there is provided a safety shield for protecting observers from flying fragments or debris resulting from a failure of a vacuum or pressure chamber viewing port including a safety shield member, formed from a plate of optically clear shatter-resistant material, and hardware for mounting the shield member to the viewing port while providing an air gap between the shield member and the viewing port. The shield member is not subject to the cyclic stresses imposed on the viewing port window because of the air gap between the shield and viewing port. In the event that the viewing port accidentally fails or shatters, any flying fragments or debris resulting from an implosion or explosion will be deflected by the shield away from an observer.

Preferably, the safety shield member is formed having a shape identical to the viewing port and is at least as large as the viewing port. The safety shield is formed from Plexiglas, Lucite, or other shatter-resistant optically clear materials. The safety shield is mounted to the collar of a conventional vacuum or pressure chamber viewing port by three or more threaded rods. Locknut spacers are used to attach the safety shield to the threaded rods. The threaded rod and locknut assembly allows the air gap between the viewing port and safety shield to be readily adjusted. Advantageously, the view into the vacuum or pressure chamber is not obstructed by the optically clear safety shield.

BRIEF DESCRIPTION OF THE DRAWING

These and other objects, features and advantages of the present invention are presented in the following detailed description of the preferred embodiment and illustrated in the accompanying drawing figures wherein:

FIG. 1 is a perspective view of a safety shield constructed in accordance with the principles of the present invention shown attached to a viewing port of a vacuum or pressure vessel;

FIG. 2 is a front view of the safety shield shown in FIG. 1;

FIG. 3 is a right side sectional view of the safety shield and viewing port taken along lines 3-3 of FIG. 2.

DESCRIPTION OF THE PREFERRED EMBODIMENT

In FIG. 1, there is shown a chamber, generally designated by numeral 1, which can be a vacuum chamber or a high-pressure chamber, having a view port assembly, generally designated by numeral 3. A safety shield member 5 is attached to the view port by threaded rods 7 which support the shield member in a spaced apart relationship from view port assembly 3.

As illustrated in FIGS. 2 and 3, view port assembly 3 includes a flange 9 formed integrally with vacuum/pressure vessel 1 and a concentric collar 11 attached to flange 9 by a plurality of threaded rods 7, the rods being disposed through a number of mating openings 10, 12 formed respectively through flange 9 and collar 11. An optical window 13 is disposed between flange 9 and collar 11 along an annular recess 15 which is formed along facing portions of flange 9 and collar 11, respectively. One or more O-rings 17 can be disposed along recess 15 to perfect the seal between window 13 and members 9, 11. Collar 11 is compressed against window 13 by nuts 19 and 21 to seal the windows against the surface of flange 9 and the O-ring 17 to form an airtight viewing port assembly.

Safety shield 5, which has a shape similar to that of the viewing port assembly (i.e., the shield is circular for a circular viewing port), is slightly larger than viewing window 13 so that a number of openings 14 can be formed about the periphery of shield 5 to receive outer portions of threaded rods 7. A bevel 29 can be formed along edge 27 of shield 5 to provide a smooth edge and prevent accidental chipping of the shield material. Shield 5 is fastened to threaded rods 7 by a plurality of inner and outer locknuts 23 and 25, respectively, which secure the safety shield in a spaced apart relationship with respect to view port assembly 3. Locknuts 23 and 25 allow ready adjustment of the air gap or spacing between shield 5 and window 13. Of course, other mounting and adjustment arrangements could be used, depending on the size and configuration of the view port to which the safety shield is to be installed.

Safety shield 5 may be formed from a wide variety of optically clear shatter-resistant materials. Materials such as methyl methacrylate and methacrylate resins (Lucite, Plexiglas, etc.) are of particular utility because of their optical clarity, ease of machining, and resistance to shattering. A ½ inch thick plate of Plexiglas spaced one inch from a vacuum or pressure chamber viewing port has been found to be virtually shatter-proof when subjected to bombardment by explosive fragments from the shattered view port window. Of course, other types and thicknesses of shatter-resistant materials can be used.

In a typical installation, flange 9 and collar 11 respectively include six sealing bolts disposed in equi-spaced openings 10 and 12 arranged about the circular view port. In order to mount the safety shield of the present invention, three equi-spaced bolts are removed and replaced by threaded rods 7. Locknuts 23 are threaded on rods 7 at a position depending on the spacing desired between shield 5 and window 13. Shield 5, having three equi-spaced peripheral openings 14, is mounted onto the threaded rods. Locknuts 25 are then threaded onto the outer portions of threaded rods 7 to secure the shield and complete the assembly.

An important feature of the present invention is that safety shield 5 is not subject to the stresses imposed on view port window 13 when window 13 is under pressure. After repeated pressure cycling of chamber 1, window 13 may become weakened and fail. Often, such a failure results in shattering of window 13 and a resultant implosion or explosion of window fragments. When chamber 1 is at a pressure substantially below atmospheric, for example, the shattering of window 13 and resultant implosion of window fragments into chamber 1 can result in fragments colliding with the walls of chamber 1 and rebounding back out the shattered view port assembly 3. High-speed flying fragments and debris can pose a lethal or injurious situation to personnel who are in proximity to window 13 when it shatters.

Unlike prior art "double-pane" or mesh reinforced airtight viewing windows for vacuum or pressure chambers, in the present invention pressure stresses placed on window 13 do not affect shield 5, because an air gap is always maintained between safety shield 5 and window 13. Thus, if window 13 shatters, shield 5 deflects flying fragments or debris of the shattered window from personnel or equipment near the view port. In addition, some of the energy of the flying fragments is spent in elastic collision with the safety shield; thus slowing any deflected fragments. The optically clear safety shield of the present invention allows an unobstructed view of the interior of the vacuum or pressure chamber and is easily fabricated and attached to conventional vacuum or pressure apparatus. Adjustment of the air gap between the view port and safety shield is simple using the threaded rods and locknut spacing hardware.

While the safety shield of the present invention has been described in considerable detail, it is understood that various changes and modifications may occur to persons of ordinary skill in the art without departing from the spirit and scope of the invention as defined in the appended claims.

What is claimed is:

1. A safety shield for a vacuum/pressure chamber viewing port, comprising:
   an optically clear safety shield member;
   a plurality of threaded rods extending through said optically clear safety shield member and said vacuum/pressure chamber so that said optically clear safety shield member is axially aligned with said viewing port;
   a first pair of nuts threaded on each of said threaded rods, said nuts bearing against opposite sides of said vacuum/pressure chamber for securing said threaded rods to said vacuum/pressure chamber; and
   a second pair of nuts threaded on each of said threaded rods, said second pair of nuts bearing against opposite sides of said optically clear safety shield member, and said second pair of nuts being adjustable along said threaded rods to adjustably space said optically clear safety shield member from said viewing port.

2. The safety shield of claim 1 wherein said shield member is formed from an optically clear, shatter-resistant material and has a shape corresponding to the shape of said viewing port.

3. The safety shield of claim 2 wherein said shield member is formed from a methacrylate resin.

4. The safety shield of claim 1 wherein said shield member is larger than said viewing port.

5. The safety shield of claim 3 wherein said shield member is of sufficient thickness to contain said viewing port explosion fragments.

6. The safety shield of claim 5 wherein said shield member is formed from a plate having a thickness of at least ½ inch.

* * * * *